July 1, 1952

R. W. ERWIN 2,601,903

METHOD AND APPARATUS FOR TREATING CRUDE
OIL EMULSIONS FROM OIL WELLS

Filed Feb. 24, 1948

Inventor
Ransome W. Erwin,
By Munn H Lane
Attorney

Fig. 3.

Patented July 1, 1952

2,601,903

UNITED STATES PATENT OFFICE 2,601,903

METHOD AND APPARATUS FOR TREATING CRUDE OIL EMULSIONS FROM OIL WELLS

Ransome W. Erwin, Dallas, Tex., assignor to Salt Water Control, Inc., Fort Worth, Tex., a corporation of Texas Application February 24, 1948, Serial No. 10,508

27 Claims. (Cl. 183—2.7)

The invention relates to improvements in method and apparatus for treating crude oil emulsions from oil wells, and is in the nature of an improvement on the method and apparatus disclosed in my prior application Serial No. 713,708, filed December 3, 1946, of which the present application is a continuation in part.

In common with the disclosure of my prior application the improved method is preferably carried out in connection with a horizontal treater which includes a plurality of individual chambers or zones, including (1) a heating chamber wherein heat is supplied to the fluid to be treated and wherein a portion of the gas is removed; (2) a baffling chamber or washing zone, the primary function of which is to break up the emulsion and to at least partially separate the oil and water constituents thereof prior to their passage to the next treating zone; (3) a filtering and settling zone which receives fluids from the washing zone and brine from the water knockout zone, in which zone the oil is filtered and from the top of which clean oil is withdrawn, after which the oil is cooled, preferably by heat interchange with the incoming fluid to be treated in the heating chamber, water or brine being withdrawn from the lower portion of the filtering or settling zone; and (4) a free knockout water chamber into which the crude emulsion which has been preheated by heat interchange with the outgoing treated oil and with the hot liquids in the heating chamber is discharged, in which knockout chamber separation of free water from the emulsion takes place as well as separation of a portion of the gas contained in the fluid to be treated.

In accordance with the specific embodiment of my invention as disclosed in my prior application the treater is in the form of an elongated horizontal casing divided lengthwise by means of suitable partitions or plates into the several horizontally aligned zones, with the heating chamber at one end and the water knockout chamber at the other, and with the washing and filtering zones interposed between the two end zones. In accordance with the present embodiment of the invention, on the other hand, the heating chamber and the knockout chamber are arranged in superposed relation adjacent one end of the treater and are separated from each other by a perforated horizontal partition, the heating zone being located directly above the knockout chamber, and both being surrounded by a heat interchange jacket. The washing or baffling chamber and the filtering and settling chamber are arranged beyond the heating and knockout zones, and the filtering and settling chamber, which, in the embodiment set forth in my prior application, are combined in substantially one zone, are, in the present device, shown as separated into two more or less distinct zones or chambers. Other distinctive features of the present device will be apparent as the present description proceeds.

OBJECTS OF INVENTION (1) An important object of the invention is the provision of mechanical improvements in the free water knockout apparatus adapted for both vertical and horizontal types of emulsion treaters. Such improvements include oil, emulsion and water inlet spreaders leading to the knockout chamber, water withdrawal means leading from the knockout chamber, hot water return means leading to the knockout chamber, and oil-emulsion discharge means leading from said chamber. The purpose of this is to provide simpler construction, more efficient spreading with minimum agitation, more efficient introduction of oil into the heating chamber from the knockout chamber, better water pickup facilities from the knockout chamber with minimum localized channeling or suction, more efficient mingling of returned hot water with incoming fluids to the knockout chamber, and to provide apparatus that may be cleaned with minimum labor and difficulty.

(2) A further important object is to provide a simple means and method for removing water from a horizontal type emulsion treating system zone as the water is dropped out of the emulsion, and to provide means for returning it to another lower pressure settling zone of the same system. Here entrained oil is floated from water as it rejoins the oil stream, flowing with it, but not mixing, both oil and water going to a final settling zone where each is withdrawn separately from said zone.

(3) A further object is to provide forced passage of oil, emulsion and entrained gas through porous or perforated spreaders in one or more succeeding wash zones as described in my application Serial No. 713,708, but with an added improvement consisting of continuous and automatic removal of water from each zone as it is separated from the oil and emulsion mixture. By removing the water in this manner nothing but oil, emulsion and gas is forced through the porous or perforated spreader in the succeeding wash or baffling zone, thereby eliminating the evil of re-emulsifying the oil with the water that has once been separated from it. Other emulsion treating systems provide for removal of water from each wash zone, but all such systems with which I am familiar are gravity flow systems and do not provide forced flow of oil and emulsions through succeeding wash zones, hence the gravitational removal of water in such systems is simple, forthright and requires no novel means such as will be disclosed in this invention. Moreover, removal of water from each zone assures minimum and decreasing emulsion load on each succeeding zone as it pursues its path through the wash system. This water removal, in accordance with my invention, is accomplished automatically and without use of moving parts or mechanisms by employing inverted U type gas vented water legs, either adjustable or non-adjustable, which may be located either inside the wash zone or outside connected in through openings, with sufficient liquid seal on the drain risers to prevent normal entrained gas volumes from breaking through and flowing with the withdrawn water. By having these drain risers sufficiently high to do this, the gas, oil and emulsion can pursue but one path which is the desired one through the restricted porous or perforated spreaders in each wash zone. Thus the water passes over the vented inverted U as it is released from the emulsion, maintaining a definite oil-water level in the wash zone, and avoiding remixing or re-emulsifying oil and water.

(4) Still another object is the breaking down of oil-water emulsions, separating the oil and water from each other by any conventional settling and washing means, withdrawing the water from the oil prior to succeeding washing and baffling, then rejoining the oil and water in separate flowing strata, passing both strata through a common filter, deterrent or impediment medium prior to entering the final settling zone. In this impediment or filtering zone entrained water in the oil is coalesced and dropped out to the flowing stratum of water beneath, and entrained oil in the water is scrubbed and floated out of the water passing into the flowing oil stratum above. This is best accomplished in my horizontal treater as will be shown, automatically and without resort to valves, floats or other means with moving parts.

(5) A further object is to provide an insulating and cushioning layer of gas between the oil zone and the partition separating the free water knockout from the heating chamber. This gas zone has three important functions, as follows:

(a) To insulate the free water knockout zone from the heating zone, preventing easy transfer of heat from the hot zone to the cooler zone.

(b) To provide a resilient cushion to absorb uneven heads or flow of fluids into the free water knockout chamber, thus providing for a more steady feed of oil and emulsion from the free water knockout zone to the heating zone.

(c) To provide a large surface area above the layer of emulsion, permitting excess absorbed and entrained gases to break out of solution, thereby permitting their separation from the oil and emulsion.

The thickness of this gas zone is determined by the vertical location of vent holes in the emulsion feeder "up pipes" which convey oil and emulsion from free water knockout zone to the spreaders in the heating zone. Should there be an excess of gas that the vent holes are unable to handle, then it forms a thicker layer and vents through a special conduit that conveys it up through the heating chamber, discharging it into a gas space above the liquids in the heating chamber.

(6) Another object is to provide a means and method of safely and simply by-passing surplus gas around the spreader wash zones, thereby avoiding overloading of same, taking the gas from one part of the flow system (the heating zone) and returning it to another part with minimum disturbance to the liquids therein. This is accomplished by permitting surplus gas to travel with the water from the free water knockout, once sufficient back pressure to break the liquid seal in water by-pass has been formed, and introducing water and gas into a vertical conduit that permits gas to bubble up through it without agitating the water-oil strata in this zone. The water is discharged from the lower part of this conduit, the gas from the top end which protrudes into the gas zone of this introduction chamber. Normally, if a moderate amount of gas enters with the oil, emulsion and water into the treating system, the gas will travel with the oil and emulsion through the spreaders and wash zones. This obtains because of the gas pressure resistant water liquid seal in the down pipes leading to the water by-pass line which is broken only when introduction of surplus gas causes excess pressures to build up.

(7) A further object is provision of means for thoroughly cleansing the gas of mists, foams, etc., by passing it through a common filter or impediment medium with the oil and water streams, without mixing with either oil or water. So far as I am aware this can be accomplished only in a system with horizontal flow as depicted with novelty in this disclosure. Thus the entrained mist or foam knocked out of the gas falls directly into the flowing oil stratum where it rightly belongs.

(8) Another object is the provision of controlled and automatic discharge of gas from the system by use of a float actuated gas discharge valve located in the final oil-water settling zone. Surplus gas may be thus handled, whereas smaller, unimportant volumes of gas may be allowed to pass on with treated oil to the stock tanks.

(9) Another object of this invention is to facilitate cleaning and inspection of conduits and zones by having all water discharging conduits attached only to manway covers of each zone cleanout manway, making them easily removable from the vessel.

The invention will be more readily understood by reference to the accompanying drawings and the following detailed description, in which a specific embodiment of the inventive thought is set forth by way of illustration rather than by way of limitation.

As shown, the treater comprises an elongated horizontal tank 1 which constitutes the main treating vessel, and this preferably includes three principal chambers or zones A, B and C arranged in horizontal alignment from left to right. The zone A at the right-hand of the treater is a combined heating and knockout zone and is subdivided by a horizontal perforated partition 12 into an upper or heating chamber $A^1$ and a lower knockout chamber or zone $A^2$, the whole zone A being surrounded by an annular heat exchanger $A^3$ which serves to preheat the untreated emulsion entering the system and to cool the treated hot clean oil from which water and gas have been removed, prior to the final discharge of the cooled clean oil from the system. The zone B intermediate the zones A and C is separated from the zone A by a partition 22 and comprises the baffling or washing zone. The zone B is divided into sub-zones and is provided with a plurality of upright pipes having perforated, serrated or porous outlets to facilitate the washing and baffling operation, each pipe discharging into a chamber or section of the composite zone which is separated from the next zone by a partition similar to the partition which separates the zone B from the zone A. Any desired number of pipes and sub-chambers may be employed in connection with the washing or baffling zone B.

The washing or baffling zone is separated from the filtering or settling zone or chamber C by a partition 30, while a pair of porous plates or partitions 33 and 33' divide the major filtering and settling zone C into sub-zones or compartments $C^1$, $C^2$ and $C^3$. The compartment $C^1$ may be termed the water receiving sub-zone and extends between the partitions 30 and 33, while compartment $C^2$ extends between two porous plates 33 and 33' and may contain any suitable filtering means, such as excelsior, glasswool, or the like, and may be referred to more particularly as a filtering portion of the zone C, although settling also takes place within this sub-zone. As shown, glass wool is employed in the gas zone and wood excelsior is employed in the oil and water zones of the filtering chamber. The sub-zone $C^3$ extends from the perforated plate 33' to the end of the treater and may be referred to as the final settling chamber. From the top portion of this settling chamber surplus gas may be withdrawn from the system, while brine or water separated from the fluid being treated is withdrawn from the lower portion of the chamber, and from the intermediate portion of the chamber clean oil is withdrawn, which, after preheating the incoming emulsion passing through the heat exchanger $A^3$, is discharged from the system and passed to storage.

It will be noted that a gas layer or zone D extends along the entire upper portion of the treating vessel or tank 1, including the top portions of each of the zones A, B and C, so that the entire system is subject to gas pressure, and it will be further noted that this gas zone is connected with inverted U-pipes E and E' at either end of the treater, also designated by numerals 44 and 61, which are utilized for controlling the oil-water level in the heating chamber $A^1$ and in the final settling zone $C^3$, respectively.

Some of the principal zones of the apparatus having been briefly described principally by the use of reference letters in order to give an idea of the general arrangement and operation of the device, a more detailed description of parts will follow, in which reference numerals will also be employed to describe particular parts or elements of the system.

Commencing with the zone A, the heat exchanger $A^3$ which surrounds the right-hand end of the main horizontal treating vessel 1 comprises an inner annular space 2 through which untreated fluid containing oil, emulsion, gas and water is supplied to the system, which inner space is separated by means of a jacket 3 completely or substantially surrounding the main vessel, from an outer annular space 4 through which hot treated oil is passed in the heat interchange relation to the incoming emulsion, etc., prior to discharge of the treated material from the system and passage to an oil storage tank or the like.

The incoming fluid under flowing pressure and comprising an oil-water emulsion, together with untreated oil, gas and water, is supplied to the inner space 2 through an inlet pipe 6 leading from a source of supply such as an oil well, or from a gas separator or the like (not shown). The incoming fluid is preheated not only by interchange with the outgoing oil in the outer space 4, but also by heat interchange with the contents of the tank in the upper or heating zone $A^1$ and in the lower or free water knockout zone $A^2$. The preheated emulsion, etc., under flowing pressure passes from the space 2 through 2 through a top opening 7 at the opposite end of the jacket from the inlet 6 and thence passes downwardly through a downpipe 8 which leads to a spreader which, in turn, discharges the preheated emulsion etc. into an emulsion zone 10 located intermediate a brine containing zone or layer 40 at the bottom of the tank and an upper gas layer 11 which underlies the partition 12 dividing the water knockout chamber $A^2$ from the upper heating zone $A^1$. Emulsion from the zone 10 is discharged into the lower portion of the heating zone $A^1$ through short upright pipes 14 having their entrance openings 13 at the lower limit of the zone 10. Each of the pipes 14 is provided with one or more gas vent openings 15 located below the horizontal partition 12 for removing a normal amount of gas formed beneath the partition 12. The distance of these openings 15 vertically below the partition 12 determines the thickness of the gas zone 11 when only a small volume of gas is present. Preferably, the pipes 14 are arranged in one or more longitudinally extending rows, two being shown in Fig. 5, and spreaders 16 are provided for each row, which spreaders may be perforated, slotted or serrated. A simple and cheap form of spreader is a perforated inverted steel channel 16 with the ends capped. Each spreader 16 may lie loosely over the tops of its respective row of pipes 14, or it may be bolted or welded to the partition 12. One or more of these spreaders may be employed, each preferably underlying a heating element 17 within the heating zone $A^1$. The heating element 17 may be of any suitable design or shape, but a tri-tube design such as is disclosed in my co-pending application Serial No. 587,387, filed April 9, 1945, now Patent No. 2,495,673, dated January 24, 1950, is preferred. The heating element 17 should be substantially immersed in a brine layer 18 which extends from the top of the partition 12 to an oil-emulsion layer 19, above which is located a gas zone or layer 20 forming part of the upper gas zone D which extends along the top of the entire treating tank, as previously described.

As also previously described, a partition 22 separates the zone A from the washing and baffling zone B. An outlet pipe 21, the entrance to which passes through said partition 22, connects the zones A and B and serves to conduct oil, emulsion and gas from the upper portion of the heating chamber $A^1$ with the first section or sub-chamber of the washing zone B. The thickness of the gas layer 20 in the zone $A^1$ and of the entire gas layer D within the treater 1 is regulated by the position of the entrance to the outlet pipe 21. This pipe discharges into the section 24 through a perforated, serrated or porous outlet 23 located at the bottom of the pipe 21.

As shown, the washing zone includes sub-sections each including a downpipe similar to the pipe 21 and each provided with a perforated, serrated or porous outlet similar to the outlet 23.

The top portion of the first section 24 of the washing zone is connected with the next section through a pipe 25 similar in function and structure to the pipe 21, which pipe 25 passes through a partition 26 and discharges through an outlet 27 similar to outlet 23 into the second section or sub-chamber 28 of the washing zone. In the top of the sub-chamber 28 a third downpipe 29 similar to pipes 21 and 25 leads through a partition 30 into the lower or brine zone 31 of the final settling-filtering by-passed water receiving chamber C, above which is a clean oil zone or layer 32. As previously pointed out, the chamber C is divided into three sub-chambers $C^1$, $C^2$ and $C^3$ by the perforated plates 33 and 33' which define the filtering zone $C^2$, which may, if desired, contain excelsior or other suitable filtering media. By-passed water from the water knockout zone $A^2$ may be delivered to the first or water receiving section $C^1$ of the zone C while filtering is performed within the section $C^2$ and clean oil, gas and brine may be separately withdrawn from different levels of the final settling sub-zone $C^3$.

For withdrawing clean oil from the treater an oil outlet pipe 34, preferably elongated and perforated to prevent localized channeling or suction effect, is provided leading from the upper portion of sub-zone 63. This outlet pipe extends horizontally along the top of the clean oil layer in the sub-zone $C^3$ at its juncture with the upper gas zone 35, the depth of which gas layer is determined by the vertical location of the outlet pipe 34, and by a float control outlet valve 84 which regulates the discharge of gas from the zone 35.

From the perforated pipe 34 a downpipe $34^a$ leads to a horizontal pipe 36 which connects at 37 with the outer annular space 4 of the heat exchanger $A^3$. Oil is discharged from the top of the annulus 4 through an outlet pipe 38 leading to a place of storage or use.

Figures 1, 5:
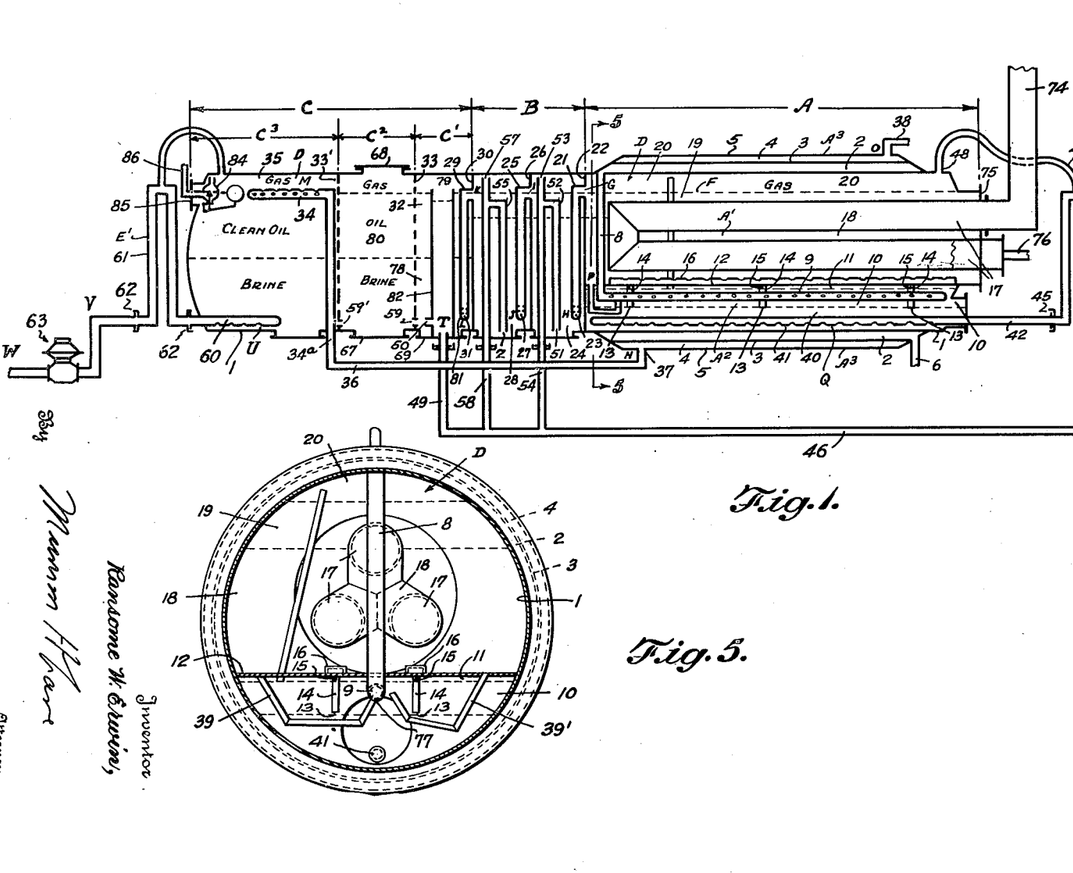
Fig. 1 is a vertical longitudinal section, largely diagrammatic in character, of my entire system, parts being shown in elevation.
Fig. 5 is a vertical transverse section on the line 5—5 of Fig. 1, but on the scale of Figs. 2 to 4, inclusive.
Figure 2:
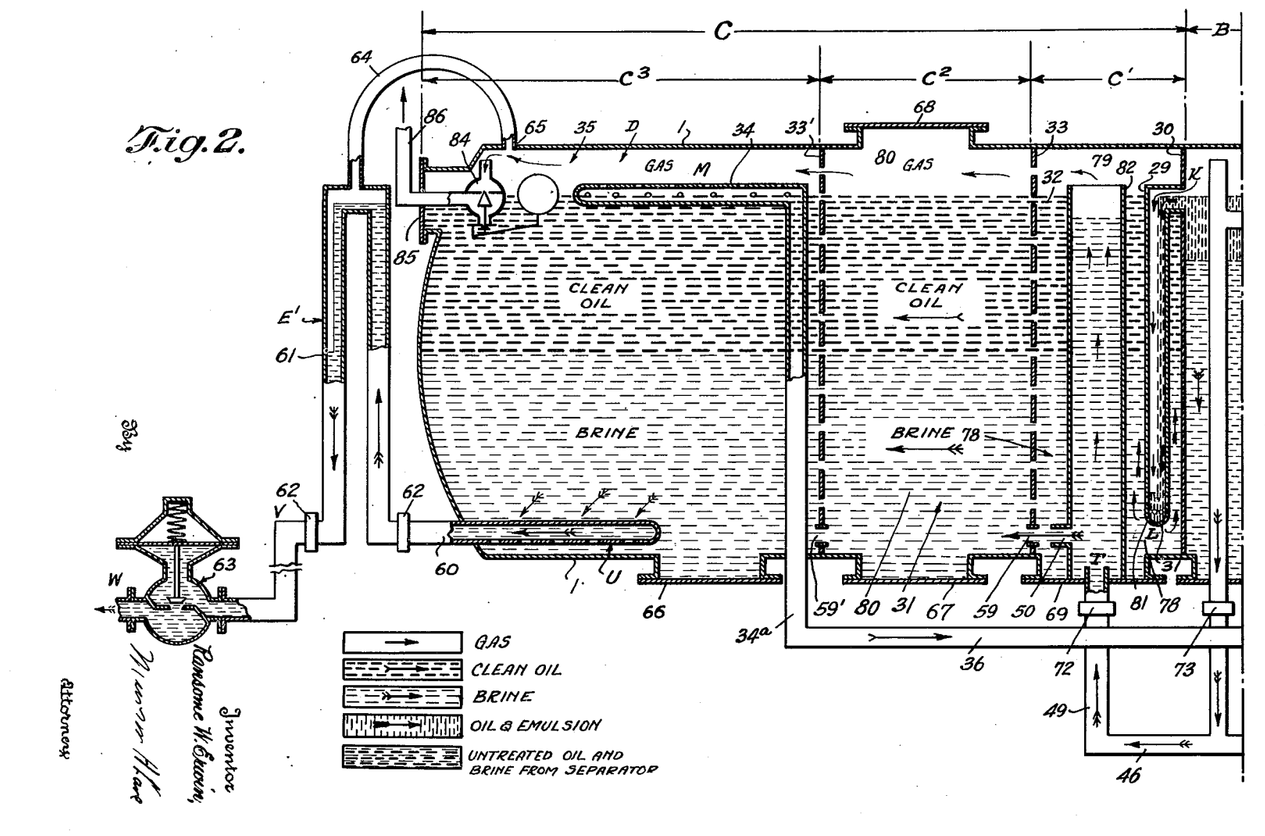
Fig. 2 is a vertical longitudinal view on a larger scale of the filtering or settling zone or chamber and a portion of the adjacent baffling or washing zone or chamber.
Figure 3:
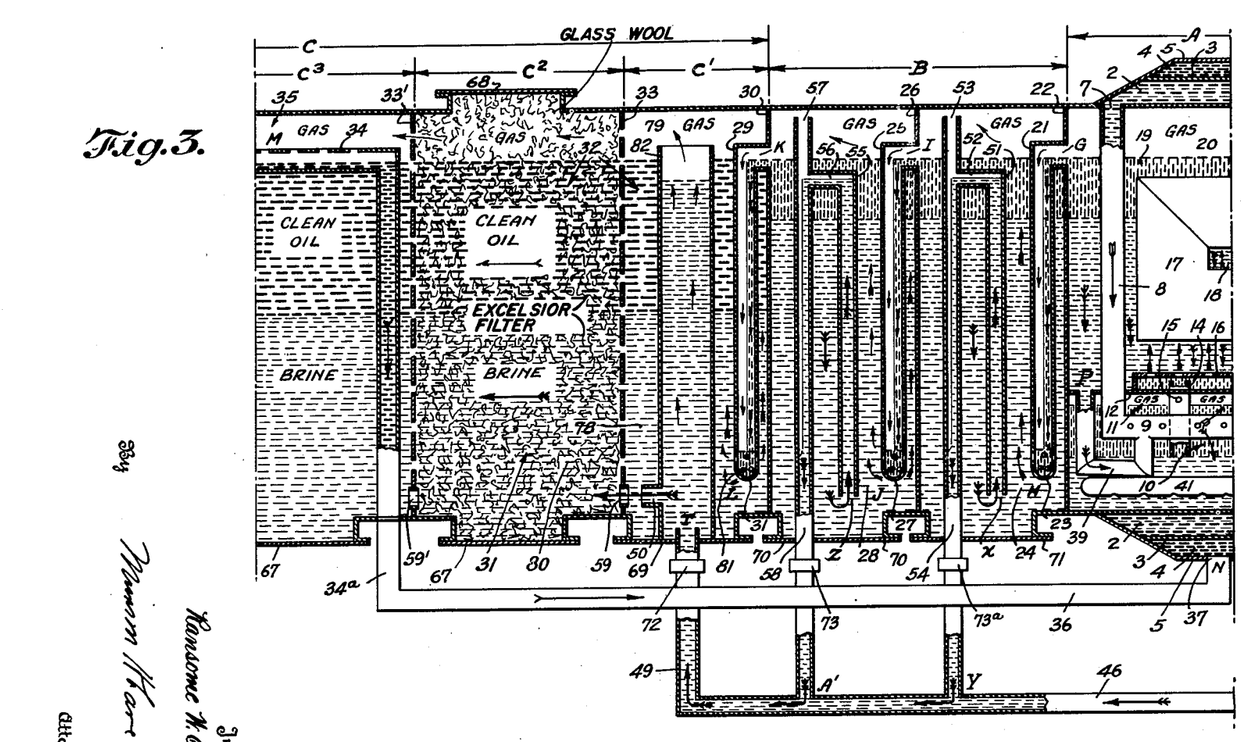
Fig. 3 is a similar view showing the baffling zone or chamber together with portions of the two adjacent chambers.

Considering now the sub zone A, means are provided near the left hand end of said zone A for returning hot water or brine from the upper heating zone $A^1$ to the lower knockout zone $A^2$. As best shown in Fig. 5, a pair of curved downpipes 39, 39' are provided for this purpose extending inwardly from the outer portion of the tank and having their inlets within the heating zone $A^1$ just above partition 12, and their outlets near the center of the tank in the emulsion layer or zone 10 of the knockout chamber $A^2$, said pipes being curved or bent intermediate their ends. As shown, the left hand return pipe 39 discharges directly beneath the spreader 9 and the right hand return pipe 39' discharges adjacent the spreader. If desired both pipes could discharge beneath the spreader 9 or both adjacent the spreader. Any desired number of return pipes may be used without departing from the spirit of the invention.

The thickness of the brine layer 40 within the lower portion of the water knockout chamber $A^2$ is determined by the level of the lower ends of the oil pipes 14 which communicate with the heating zone 18 within the upper chamber $A^1$.

Leading outwardly from the brine chamber 40 and the water knockout zone $A^2$ is an elongated horizontal brine pickup pipe 41 through which brine may be withdrawn from the knockout zone for return to the system in the first section $C^1$ of the settling and filtering chamber C. As shown the perforated pipe 41 is connected to an outlet pipe 42 passing through a manway lid and leading to the control device E comprising an inverted U-tube 44 provided with unions 45 at each end to permit pivotal swinging of the U-tube to adjust its upper level and also to permit removal of the U-tube and of the pipes connected thereto.

A water conduit 46 leads from the U-tube 44 to a liquid level riser pipe 49 which delivers the brine to a gas conduit cylinder 82 within the water receiving chamber $C^1$ of the settling zone C. A gas conduit 47, preferably flexible, connects the top of the U-tube 44 with a gas outlet 48 leading from the gas zone 20 at the top of the heating chamber. This arrangement provides an outlet for surplus gas from the zone 20 and also permits gas venting the top of the U-tube 44.

As previously stated the brine passing over U-tube 44 is returned to the system through pipes 46 and 49, the latter re-entering the treating tank through the lid of a manway 69 located in the bottom of the tank. The brine is discharged into the riser 82, the top of which opens into gas conduit 79 and is discharged from the riser 82 into a wash and discharge zone chamber 78 through an outlet opening 50 at the bottom of the riser 82. Zone numerically designated 78 corresponds generally with the water receiving zone $C^1$ of the settling chamber C.

Vented U-tubes for returning brine from which oil has been separated in the sub-chambers 24 and 28 of the washing and baffling zone B may be connected to the return pipe 46 leading from the knockout chamber and discharged into the filtering and settling zone C. As shown the tube for withdrawing brine from the chamber 24 comprises an inlet leg or pipe 51 open at the bottom located within the brine zone and connected by horizontal connection 52 passing through the oil zone above the brine zone to the downpipe 54 which passes downwardly through the oil and brine zones and connects with the conduit 46. A gas vent 53 may be provided at the top of the pipe 54 opening into the upper gase zone at the top of the treater.

Similarly, an inlet pipe 55 open at its lower portion serves to draw brine from the wash zone 28, said inlet pipe being connected at 56 to a downpipe 58 vented at its top at 57 and discharging at its lower end into the conduit 46 leading to the filtering and settling chamber C.

In order to facilitate passage of brine through the filtering zone $C^2$ (80) inlets and discharge openings 59 and 59' are provided in the lower ends of the perforated plates 33 and 33' which define said filter zone.

Brine may be finally withdrawn from the treater through a perforated pipe 60 located near the bottom of the tank within the settling zone at the left hand end of the tank. A U-tube 61 pivotally adjustable by means of rotatable unions 62 is interposed between the pipe 60 and a pipe leading to storage. In the outlet connection there is preferably provided a liquid seal water outlet control valve 63. A flexible pipe or hose 64 is shown as connecting the top of the inverted U-tube 61 with the gas zone 35 through connection 65.

Access to the interior of the tank may be had at suitable intervals through manways having removable lids. Thus, for example, a manhole 66 in the bottom of the tank provides access to the final settling zone $C^3$ adjacent brine outlet pipe 60, also upper and lower manways 67 and 68 provide access to the filtering zone $C^2$ (80) and lower manways 69, 70 and 71 in the bottom of the tank provide access to the gas conduit cylinder 82 and to the individual chambers 28 and 24, respectively, of the washing and baffling zone B.

In order to permit removal of the brine return pipes 46, 49, 54 and 58 from the treater suitable unions 72, 73 and 73$^a$ may be provided in addition to unions 45, 45 at each side of the inverted U-tube 44 which connects the pipe 46 to the perforated brine removal pipe within the knockout chamber 82.

Any suitable means may be employed for supplying heat to the contents of the chamber $A^1$. As shown, the heating element 17 is provided with an outlet pipe 74 which passes through a manway cover 75. Heat is supplied through a burner or burners 76 located within the lower tube or tubes of the heating element.

As best shown in Fig. 5, the discharge ends of the hot water return pipes 39 may be either connected to the perforated spreader pipe 9 of the oil return system, as indicated at 77, or may open near the pipe 9, both arrangements being shown.

For the purpose of numerical identification the sub-zone $C^1$ between the wall portion 30 at the end of the washing bone B and the first perforated partition 33 of filtering chamber may be referred to as a wash and discharge zone chamber and is designated by the numeral 78. The gas zone above the wash zone 78 has been designated by the numeral 79. The filter section $C^2$ formed by the partitions 33 and 33' may contain wood excelsior and/or glass wool or other suitable filtering media and may be numerically designated 80 for the purpose of identification. The perforated outlet for the oil downpipe 29 entering the wash chamber 78 may be numerically designated 81 and the gas conduit cylinder also located within the chamber 78 and into which the brine return pipe 49 discharges is numerically designated 82.

Within the zone A at the right of the treater surplus gas from the gas layer 11 in the knockout chamber beneath the horizontal partition 12 may be discharged through pipe 83 into the upper gas zone 20 at the top of the heating zone $A^1$.

Gas may be withdrawn from the top of the settling sub-chamber $C^3$ at the extreme left of the treater through outlet conduit 86 passing through manway cover 85, the said outlet conduit being controlled by a float actuated valve 84 within the chamber, the float portion of which is carried by the oil layer 32 within the settling chamber.

OPERATION (a) *Oil, gas and emulsion*

Oil, emulsion, gas and water under pressure enter the system through an inlet pipe 6 which enters the inner chamber of the heat exchange jacket $A^3$. The fluid passes up and around the vessel 1 through annulus 2 where it is preheated partly by the hot fluids within the heating zone 18 through the wall of vessel 1, and partly by hot clean oil in outer annulus 4 through jacket wall 3. The preheated fluid passes out of annulus 2 into pipe 8 through opening 7. Then it travels down to spreader 9, out into oil-emulsion zone 10. The gas layer 11 under partition 12 comprises formerly entrained gas released from the emulsion and oil. This gas accumulates to a layer thickness governed by vertical location of vent hole 15 in the oil spill pipe 14. Should more gas be produced than the vent holes 15 can handle, conduit 83 which extends slightly below vent hole 15 will conduct surplus gas to zone 20 without agitating the oil-water strata in the heating zone 18. Oil and emulsion lie under the gas layer beneath the partition 12 in a layer, allowing entrained water to drop out into the brine layer 40 and entrained gas to weather out, then the oil and emulsion pass upward through the pipe 14 at inlet 13 and out and into spreader 16 in the heating zone. The fluid leaves the spreader 16 in fine streamlets to be introduced into hot washing zone 18 above the partition 12. Thereafter the fluid lies in a layer 19 beneath the upper gas zone 20 near upper part of heating zone at F. The thickness of this impure oil layer is governed by means of the adjustable inverted U water outlet 44. Here in the zone 19 more water is dropped out due to washing and heating of the oil emulsion mixture, and more gas is weathered out into zone 20 due to heating of the oil-emulsion mixture. This hot water or brine is returned by gravity to the emulsion zone of the free water knockout chamber $A^2$ below the partition 12 through pipe 39, where it mixes with the emulsion, water and oil in and discharging from pipe 9 at outlet 77. Thus this hot returned water contributes all of its heat to the incoming fluids, thereby saving this heat and aiding in the free water removing process which is always enhanced by the addition of heat. By having the water return pipe 39 bend from the vertical enough to become horizontal and preferably even to turn upward with its outlet 77 it becomes impossible for the lighter oil or emulsion in layer 10 to discharge upwardly through pipe 39. Thus the oil and emulsion must travel as desired up through pipe 14, and offer no counterflow resistance to returning hot water through pipe 39. This solves the problem of introducing this hot water back into the midst of the emulsion without ill effects.

When the oil and emulsion mixture are heated within the upper chamber $A^1$ above the partition 12 gas entrained or in solution is released and accumulates in the upper part of heating chamber in zone 20. I have found that a reasonable amount of gas thus produced may be carried on with oil and emulsion through succeeding washing zones without any ill effects on the de-emulsifying or washing process. However, this gas should be separated or allowed to break out of the oil prior to entering the oil into the final settling zone. This is accomplished in wash and discharge zone 78. Should it prove desirable as in some cases to remove gas in heating zone $A^1$ before entering the wash zones, this may be effected as disclosed in my application Serial No. 713,708 by the use of a float actuated gas relief valve. Handling of a sudden overload of excess gas will be described hereinafter.

The oil, emulsion and gas leave heating chamber $A^1$ at G, go down through pipe 21 in partition 22 and discharge through spreader 23 at H under a pressure differential existing between wash zone 24 and heating zone 18. This pressure difference breaks the oil and emulsion up into many fine streamlets as the fluid passes through the perforations in the spreader 23 which give more washing surface contact between the entering oil-emulsion and the hot brine wash water layer in the bottom of the tank. This washing-contacting is thus much more thorough and efficient here than in conventional emulsion treaters where gravity flow due to difference in density of oil and water is the sole driving force of the oil through spreading or dispersing mechanisms. In this zone (24) water broken from the emulsion and washed out of the oil drops out and its course will be described hereinafter. The oil, unbroken emulsion and gas accumulate in the upper portion of zone 24. The gas layer 53 thickness here is governed by vertical location of outlet pipe 25 in partition 26. The oil layer thickness is governed by height of inverted vented U water drain 52. The partially treated oil, emulsion and gas pass on from zone 24 through pipe 25 at I to zone 28, repeating the aforedescribed process at J and K. The number of sub zones in the wash chamber B required is governed by the particular job to do, and the amount and type of emulsions to be handled at a given rate. In most oil treating cases two or three sub-wash zones are ample. The oil, containing little or no entrained water, with all emulsion completely broken, and gas are finally discharged from chamber B into zone 78 of chamber C at L through perforated outlet 81 at the bottom of the pipe 29. The oil seeks the stratum 32 above the level of the water or brine and the gas goes on up to zone 79. The oil passes horizontally through perforated partitions 33 and 33', through filter section 80 dropping out any entrained water it might have into water stratum 31. The oil then passes on to outlet 34 at M at the top of sub-zone $C^3$. The gas in zone 79 in sub-chamber $C^1$ also moves horizontally through filter zone 80, which may contain wood excelsior in the oil-water zones and glass wool in the gas zone, dropping out any entrained oil, mist or foam into oil stratum 32. The outgoing gas accumulates in the final gas zone 35 and leaves the tank through float actuated valve 84 and passes on through the final gas outlet 86. When gas accumulates in zone 35 it forces the oil level down, allowing the float of valve 84 to drop, thus automatically opening the valve which exhausts gas to any desired destination. If a float actuated valve is not used, then gas must pass with clean oil out at the perforated outlet 34. The clean hot oil (and possibly gas) leaves through perforated outlet 34, and passes through pipe 36 and on to outside jacket annulus 4 of the heat exchange $A^3$ at inlet 37 at point N. Here in this outside jacket annulus the hot clean oil gives up part of its heat through wall 3 to the incoming untreated fluids, thus conserving this heat and effecting desired cooling of treated oil, and gives up other heat to the atmosphere through wall 5 or outer jacket, thus effecting further desired cooling of clean oil. The clean oil leaves outer annulus at outlet 38 at point O, going directly to stock tank storage. All through the treating process the gas layer serves a very essential purpose of sealing water removing pipes to permit automatic and continuous withdrawal of water without danger of oil carryover or flooding. The gas also exerts the desired degree of pressure throughout the entire system, forcing fluids to be treated from the zone of highest pressure through successive zones in which the pressure is lower.

(b) Water flow

Figure 4:
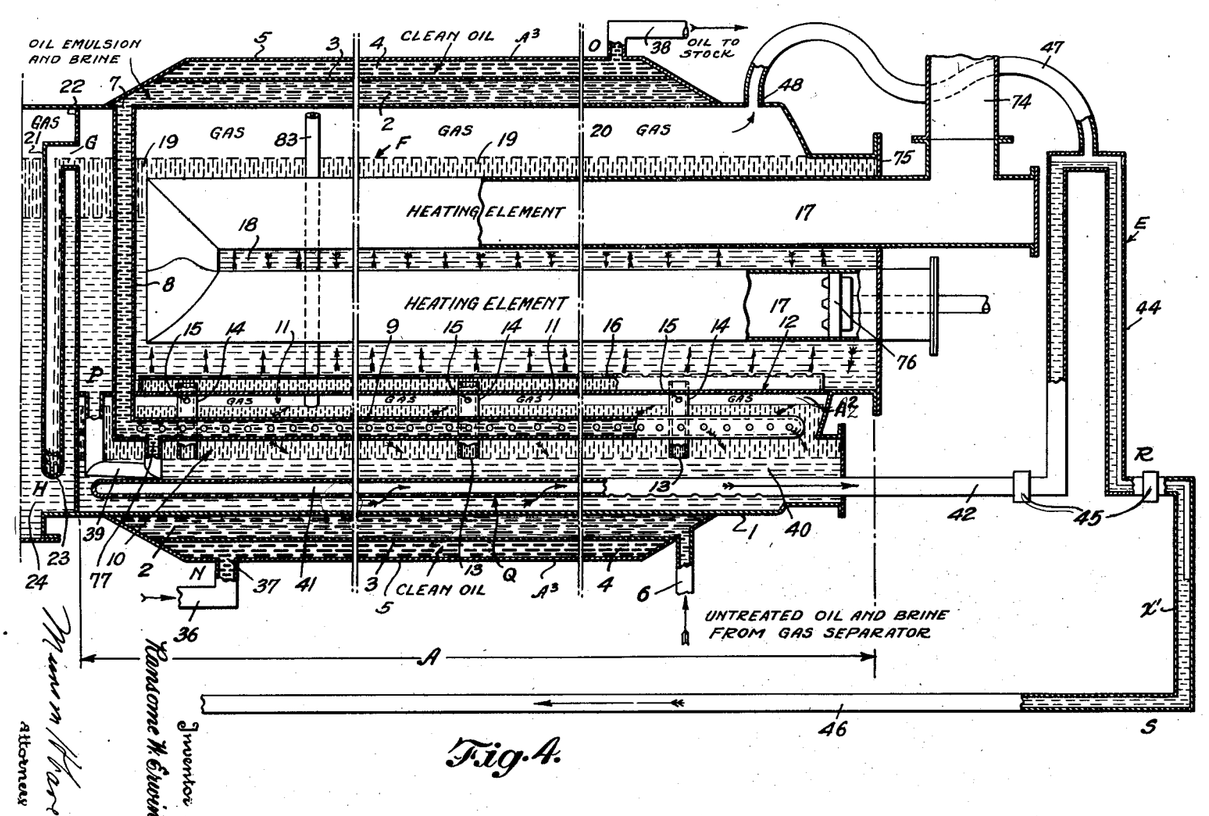
Fig. 4 is a similar view showing the combined heating and knockout zone or chamber, together with a portion of the adjacent baffling chamber or zone.

Hot water or brine returns from the sides of the heating zone 18 down to pipe 39 in partition 12 at point P (Fig. 4). The water passes first downwardly, then up and out pipe 39 at outlet 77 to be mixed with incoming oil, emulsion, water and gas in and from spreader 9. All of the water that then falls out of the oil-emulsion layer 10 in the free water knockout chamber settles down into zone 40 where it is picked up by the water outlet pipe 41 at Q. The brine passes out of the tank at 42, up and over inverted U 44 which is gas vented through flexible conduit 47. The vertical location of the top or horizontal conduit portion of the U 44 governs the oil-water level in heating zones 18 and 19. The water leaves the U pipe 44 at R, passes down into the horizontal return pipe 46 at S through length of riser pipe shown as X'. This vertical length of pipe X' constitutes a liquid seal or resistance that forces the gas and oil to pursue the path heretofore described through the spreaders and wash zones. The length X' extending below the water outlet 41 is determined by the resistance to flow of oil and gas through the perforated spreaders and wash zones that will prevail in the system. If this resistance is 5 pounds per square inch, then X' should be greater than 5/0.434 or 11.3 feet (as one foot of water head is equivalent to 0.434 lbs. per square inch). This design is governed by the fineness of oil spreaders 23, 27 and 81, and by the maximum flow rate of oil, emulsion and gas through them. Should a sudden surplus of gas be liberated in heating chamber gas zone 20, then if spreaders are too resistant to this gas and the flow of oil, the gas pressure would build up enough to overcome liquid seal X' and the surplus gas would be discharged with the water through pipe 46. This is a very desirable feature, as it acts as a surplus gas outlet from the heating zone, avoiding gas overloading of the wash zones by by-passing them as does the water in pipe 46. Any surplus gas that passes through the pipe 46 with the water enters the gas conduit cylinder 82 at T through pipe riser 49. The gas bubbles up through the water confined in the cylinder or conduit 82 on into gas zone 79 without agitating or stirring up either the oil stratum 32 or the water stratum 31 in the chamber 78. Water leaves the conduit 82 at outlet 50 near the bottom thereof, passing thence through the larger lower opening 59 and through the smaller perforations in the plate 33 located above the openings 59. It will be noted that the conduit 82 discharges into the midst of gas zone 79 above the oil level, to assure that no gas discharges into clean oil zone 32. Water broken out of the emulsion and washed out of the oil in wash zones 24 and 28 of chamber B enters the inverted, vented U pipes 52 and 56 at inlets 51 and 55 at points X and Z, then passes up and over horizontal portions of the pipes, thence out and into downpipes 54 and 58, which also act as liquid seals, and then into the main water conduit 46 at Y and A'. The water or brine then passes with other water drawn directly from the knockout chamber A² through riser 49 as already described. The inverted U pipes 52 and 56 are gas vented by top openings 53 and 57. The water outlets of the pipes 52 and 56 are preferably inside individual wash zones of chamber B and are attached to manway lids 70 and 71 so as to make them individually removable for adjustment or alteration or to permit cleaning the wash chambers. They may also be employed outside the vessel if desired. Liquid seals in pipes 54 and 58 extending below the bottom of the treater tank, serve the same function as the length X' already described.

Water passes through the opening 59 leading from the chamber 78 into the filter section 80 where entrained oil is filtered out and joins the oil stratum 32 above. The water goes on through the horizontally aligned opening 59' and also through the perforations in the partition 33' above the openings 59' to final settling zone C³. At the point U at the bottom of zone C³ water is picked up by withdrawal pipe 60, passes out and over vented inverted U 61 at V, then through diaphragm outlet valve 63 at point W to any desired disposal. Inverted U 61 is made adjustable by unions 62 and flexible gas vent line 64 which ties to gas opening 65 for venting. Valve 63 opens when sufficient pressure head is built up to overcome the weighted diaphragm therein.

The invention has been described in detail for the purpose of illustration, but it will be obvious that numerous modifications and variations may be resorted to without departing from the spirit of the invention.

It has been found that many new and unexpected advantages occur from my novel structure and mode of operation, some of which will now be pointed out in detail, while others will be apparent to those skilled in the art without further elaboration.

ADVANTAGES OF INVENTION

(A) Free water knockout structure and arrangement (1) By placing the free water knockout chamber A² beneath the heating element 17 in a horizontal treater no sacrifice is made in the capacity of the heating zone or of heating element. Thus there is saved an appreciable length of vessel that otherwise would be required for a separate free water knockout chamber (as described in my pending application Serial No. 713,708). In the present device the length of vessel A formerly devoted solely to the heating chamber is serving a dual purpose, both functions of which enhance each other.

(2) Placing the free water knockout chamber A² beneath the heating element 17 permits the gravitational return of hot treated out water from the heating chamber to the free water knockout zone, giving this horizontal system the same or similar advantages that formerly existed only in a vertical treater as described in my Patent No. 2,261,101.

(3) My novel arrangement of having hot water return pipes 39 curve from vertical to horizontal and back upwards permits introduction of hot water returned from the heating zone above the partition 12 into the midst of the emulsion zone without danger of the emulsion flowing through the pipe in countercurrent to the water, as would be the case should pipe 39 simply point down into the emulsion layer from the partition 12 functioning as the pipe 14 functions.

(4) By having the oil and emulsion spill from knockout zone 10 below the partition 12 to heating zone 18 above the partition through pipes 14 leading into perforated spreaders 16 a simpler and more efficient structure is provided than that taught in my Patent No. 2,261,101, which first disclosed this method of a delayed emulsion zone in a free water knockout beneath a heating zone by a projected spreader means. The present device is cheaper and easier to construct. It permits more thorough and flexible contacting of oil-emulsion streamlets with the heating element, as one or more horizontal spreaders may be easily fitted into this scheme in any floor pattern desired to fit a particuar designed heating element. As many up-pipes 14 as desired may be placed anywhere desired in partition 12 to introduce this emulsion into any spreader pattern above on partition 12.

(5) Accumulating entrained gas under floor 12 and allowing surplus gas to pass up through conduit 83 into gas zone 20 is a novel and distinctly advantageous construction. This arrangement permits admission of normally surplus gas volumes without undue agitation of the free water knockout zone or the oil-water zones of the heating chamber. It also obviates the heating of this gas as would be the case were it bubbled up through the heating zone. The comparatively large area of emulsion surface under partition 12 also aids materially in more efficient and thorough separation of gas from emulsion, this being possible because of gas withdrawal through conduit 83.

(6) It has been found that elongated, perforated, serrated, slotted or porous pickup and spreader conduits have proved very efficient in giving undisturbed and uniform pickup of water and thorough undisturbed spreading of incoming fluids as described by spreader 9 and water pickup 41 in this disclosure. This design of the horizontal free water knockout lends itself very well to the use of such spreading and draining devices.

(7) By having the water drain conduit 41 attached only to manhole plate 42, it may be easily removed for cleaning and thus give more access to the free water knockout chamber for ridding it of accumulated sediment.

(B) Advantages of general water removal arrangement (1) It has been found that the large volumes of water removed from the oil in the free water knockout chambers usually contain appreciable amounts of entrained oil unless the knockout chamber is extremely large or unless the water is passed through some sort of deterrent or filter medium for removing this oil. The design of compact, economical pressure operated treating systems seeks the smallest possible knockout chamber, supplementing this with a filter means. It is not practicable to put a filter medium in the free water knockout chamber presented in this disclosure, so it proves advantageous to return the water to the treating system further along the flow plan, after the separated oil portion has been washed and baffled, using a common filter for both oil and water. Also, by returning this free water back into the system, all water may be finally discharged through a single control valve as shown. It is always good design to have as few filter sections as possible as it lessens construction cost and maintenance, and my method and arrangement follow this by having one good filter surface for oil, water and gas. Having one filter section (sub-zone C²) suffice is due to returning all removed waters to the main treating system just ahead of this filter section.

(2) In my device all water removing means are automatic, continuous, and maintain constant levels of oil and water without resort to floats, valves, or hand controlling.

(3) The liquid seal arrangement in zone B on the water drop pipes in conjunction with vented inverted U water drains is an important feature of the water removal and return method. Without the use of floats or valves, otherwise required, water may be withdrawn from each zone free of oil flooding, allowing the oil to flow by pressure through restricted wash zones independently of water incumbrance; with said water being returned to the system in sub-zone C¹ for final filtering and settling in sub-zones C² and C³ along with the baffled, washed and de-emulsified oil. This arrangement offers the advantage of increased efficiency and capacity for a given size treating system as compared with conventional gravity flow systems.

(4) By removing water from each wash zone as it is separated from the oil and emulsion the chances for re-emulsification of oil and water in succeeding wash-dispersal zones are greatly minimized or eliminated completely. It is not broadly novel to remove water from each baffle zone by hand controlled valves or gravitational flow where oil moves from one baffle to the next (usually in vertical travel) by virtue of difference in density of oil and water; but to do so as aforedescribed in a system flowing under induced pressures and continuously and automatically is a distinctive feature of the present invention. As described in my pending application Serial No. 713,708, this pressure flow washing, dispersing, and baffling offers much more efficiency and capacity for washing and emulsion breaking due to more thorough contacting of emulsion with the hot water washing medium because more fine streams can be formed from the oil and emulsion than is possible in gravity flow systems.

(5) Removal of water from each zone as it is separated further reduces the fluid and emulsion load on each succeeding wash zone until the emulsion is finally and completely resolved into pure oil.

(6) By having all the wash zone internal water removal conduits solely attached to manway lids as herein disclosed they may easily be removed for scaling or cleaning, giving better access to wash zones for scraping and cleaning.

(7) By having all return water discharge into a gas conduit flume or riser 82 as shown entrapped gas and excess gas volumes flowing with the water are permitted to re-enter the treating system and pass up to the gas zone without disturbing the oil or water strata in the settling zone.

(C) *Advantages of filter arrangement*

(1) The feature of providing a segment C² in a horizontal cylinder formed by two vertical, perforated baffles or screens comprises a simple and effective structure for performing the filtering operation in an emulsion treating system.

(2) By having manholes 67 and 68 at the top and bottom of the filter section C² insertion and removal of filter medium is facilitated.

(3) The simple and undisturbed horizontal flow of oil and water through the filter in separate streams, as taught in this disclosure, permits filtered out oil from the water layer 31 to join the upper oil stratum 32, and coalesced, filtered out water from oil in layer 32 to join the lower water stratum 31.

(4) If, as in the case with extremely heavy asphaltic oils, more filtering capacity than that herein illustrated is required, vertical partitions 33 and 33′ may be spaced as widely apart as experience proves necessary, adding other top and bottom manways to facilitate insertion and removal of the filtering medium as may be required. No additional partitions would be necessary.

(5) It has been found advantageous to follow the general method of roughly separating the oil and water by washing and settling means, then rejoining them with minimum disturbance in contacting, but separately flowing oil and water strata 32 and 31 respectively for final treatment, with a common filtering of both streams in zone C² if necessary, or merely common settling if filtering or deterring prove unnecessary. This obtains because, without disturbance or undue agitation, oil and water will not mix or emulsify once they are thoroughly separated. The present method of roughly separating out the water in chamber A, thoroughly treating the separated emulsion in chamber B, then recombining them in zone C¹ of chamber C in separate undisturbed strata for final filtering or settling, or both, constitutes an important feature of the invention. Previous systems that undertake to filter oil for the purpose of removing entrained oil or other foreign matter do so with independent filters for both oil and water, thereby complicating and hampering the efficiency of their process and failing to benefit from the advantages shown in this disclosure.

(6) My improved filtering arrangement in an emulsion treating system also permits mist extraction from gas with the same filter section used for the oil and water, allowing the filtered out oil entrainment from the gas to return directly to the oil stratum.

(D) *Advantages of gas handling arrangement*

(1) By venting gas through the pipe 83 as described, unwanted agitation of the emulsion settling zone in the free water knockout chamber C² is greatly minimized.

(2) By venting this gas thusly through pipe 83 agitation of oil-water strata in the heating zone A¹ is also minimized, thereby permitting important use of the heating chamber as an additional settling chamber for dropping out water, thus enhancing the efficiency of the free water knockout chamber.

(3) Avoidance of bubbling surplus gas up through hot oil in the heating chamber minimizes agitation of the oil and weathering or dripping of light ends and vapors from the oil.

(4) Bypassing gas through conduit 83 through the heating zone saves on fuel and unnecessary loading of the heating system by avoiding heating of the gas.

(5) Allowing surplus gas to leave the heating chamber with water only through pipes 41, 42 and 46, bypassing succeeding wash zones, avoids undue turbulence and the cutting effect that gas would cause when passing with oil, emulsion and water through perforated or porous spreaders in said wash zones.

(6) Re-introducing this surplus gas with water through pipe 49 into the gas conduit flume 82 permits the gas to pass safely through the oil-water settling zone C' with minimum disturbance to either.

(7) Filtering gas, along with oil and water, through a common filter or impediment in zone $C^2$ knocks out of the gas entrained oil, foam or mist, allowing these substances to rejoin the oil stratum 32 immediately beneath the gas stratum 79. Many oils have been found to be extremely subject to foaming when they are heated and when their gases are released. Separation or saving of this oil foam has proved to be a difficult problem to handle with conventional treating and separating systems. My improved gas filtering arrangement has proved to be a very adequate answer to this problem. If desired, a layer of glasswool may be used to advantage on top of wood excelsior in the filter section $C^2$, the gas passing through the glasswool, and the oil and water through the wood excelsior. Glasswool will not pack or become water soaked and settle, as will wood excelsior, and it has proved to be a most excellent mist extracting medium for gas.

(8) A simple float controlled valve arrangement 84 for removing gas from the system is shown which is adequate and easy to remove for cleaning or inspection by attaching it solely to the lid of manway 85. If, for any reason, an oil and gas separator should be required ahead of the treating system herein described, then this gas discharge valve might not be required, as the small amount of entrained gas carried into the system from the oil and gas separator could then overflow through pipe 34 with the clean oil and travel with the same oil to the stock storage tank, thereby reabsorbing all vapors contained in the gas back into the cooled clean oil.

(9) A further advantage of this gas handling arrangement is the large surface area available in a horizontal system such as this for separating gas from the oil and dropping the entrained oil out of the gas. All of the area beneath the free water knockout partition 12 is available for gas separation, as is all the area above the oil stratum in the heating chamber and all the oil stratum depicted as 32 in this disclosure. This advantage obtains without sacrifice to the good emulsion treating features of the system, as this gas arrangement definitely enhances the treating method herein described.

I claim:

1. An emulsion treater comprising an elongated horizontally disposed tubular casing comprising a plurality of separate chambers in horizontal alignment, including at one end a combined heating and free water knockout chamber, and at the other end a filtering settling chamber, and an intermediate washing and baffling chamber, substantially upright partitions separating the horizontally aligned chambers, a horizontal partition separating the combined heating and knockout chamber into upper and lower heating and free water knockout zones respectively, means for supplying under pressure fluid to be treated to the free water knockout zone, restricted conduit means for conducting fluid undergoing treatment through said partitions, and means for separately withdrawing oil and water from the treater.

2. An emulsion treater comprising an elongated horizontally disposed tubular casing, upright partitions separating the casing into a plurality of chambers in horizontal alignment, partitions separating said horizontally aligned chambers, said casing including at one end a combined heating and free water knockout water chamber, and at the other end a filtering and settling chamber, and an intermediate washing and baffling chamber, said combined heating and knockout chamber including a horizontal partition dividing a lower water knockout zone from a superposed heating zone, means for withdrawing hot clean oil from the upper portion of the filtering and settling chamber, means for supplying fluid to be treated to the water knockout zone, and a heat interchanger substantially completely surrounding and in close proximity to the treater at the heating end thereof, having an outer jacket for receiving the hot oil from the filtering and settling chamber, and an inner jacket for receiving the fluid to be treated prior to its entrance into the treater, whereby the incoming fluid is preheated and the outgoing oil is cooled prior to its passage to storage.

3. A method of treating mixed fluid from an oil well, which fluid includes water, oil and emulsion, which comprises first separating free water from the oil and emulsion, then subjecting the oil and emulsion to heat treatment and washing to resolve the emulsion and remove any remaining water therefrom, then rejoining the separated out water with the treated oil in superposed horizontally moving strata for final flotation of oil from the water.

4. A method of treating emulsion in a horizontal treater, which comprises breaking the emulsion in a series of steps, removing from the treater water treated out in each step, and recombining the removed water with the finished oil in superposed horizontally moving strata within the treater for final flotation of oil from the water, and settling of entrained water from the oil.

5. A method of treating mixed fluid from an oil well, which fluid includes water, oil and emulsion, which comprises first separating free water from the oil and emulsion, then subjecting the oil and emulsion to heat treatment and washing to resolve the emulsion and remove any remaining water therefrom, then rejoining the separated out water with the treated oil in superposed horizontally moving strata for final flotation of oil from the water and filtering the oil and water strata during their horizontal movement.

6. A method of treating emulsion, which comprises breaking the emulsion in a series of steps, removing water treated out in each step, and recombining the removed water with the finished oil in superposed horizontally moving strata for final flotation of oil from the water, and the settling of entrained water from the oil, and filtering the oil and water strata during their horizontal movement.

7. A method as set forth in claim 4 wherein gas is separated from the emulsion in each step in a plurality of separate zones, and a portion of the removed gas is removed with the water in each step, while a portion of the gas is maintained with the oil, thereby insuring the maintenance of a gas seal in each zone, while avoiding overloading of said zone with gas.

8. An emulsion treater including a plurality of horizontally aligned wash chambers for separation of oil, gas and water from the emulsion, upright partition means separating the chambers, restricted conduits connecting said chambers and extending through each of said partition means, and means for withdrawing water from each chamber comprising gas vented liquid seal risers, one in each chamber, each comprising an inverted U-tube having one leg opening at the bottom of the chamber to permit water to enter, and having a second leg connected thereto near the top of the riser and extending downwardly through the bottom of the chamber for discharge of water, and each having a gas vent pipe extending into the upper portion of the chamber.

9. In an emulsion treater comprising a closed horizontally disposed casing, a combined heating and free water knockout chamber adjacent one end of the casing, an upright partition separating the heating and free water knockout chamber from the remainder of the treater, a horizontal partition separating the combined heating and free water knockout chamber into an upper heating zone and a lower free water knockout zone, means for admitting fluid to be treated to the free water knockout zone, heating means within the upper chamber, means for passing fluid from which free water has been separated through the partition into contact with the heating unit of said heating chamber whereby the fluid is separated into water, oily and gaseous portions, means for maintaining a controlled liquid level within the heating chamber, means for passing the oily fluid from the heating chamber through the upright partition for further treatment of said oily fluid, and an equalizing pipe extending from the top of the heating chamber to a space just below the horizontal partition in the free water knockout zone.

10. An emulsion treater having an upper heating chamber and a lower free water knockout chamber, a horizontal partition separating said chambers, means for admitting emulsion to be treated to the knockout chamber beneath the partition, means for maintaining a gas zone below the partition, means for passing emulsion from which free water has been separated from the lower to the upper chamber, means for returning hot treated-out-water from the heating chamber to the free water knockout chamber, means for withdrawing the treated emulsion from the upper portion of the heating chamber, means for maintaining a layer of gas under pressure in a gas zone above the liquid level in the heating chamber, and means, including a pipe opening just beneath the partition and extending into the gas zone in the heating chamber, for permitting excess gas separated out in the knockout chamber to pass from the gas zone below the partition to said upper gas zone.

11. An emulsion treater comprising a horizontally disposed tubular casing having an imperforate horizontal partition forming an upper heating chamber having a heating unit therein and a lower free water knockout chamber, means for admitting emulsion to be treated to the knockout chamber beneath the partition, emulsion transfer means for passing emulsion from which free water has been separated from the lower to the upper chamber, means for returning hot treated out water from the heating chamber to the free water knockout chamber, means for withdrawing water from the lower portion of the chamber, and means for withdrawing the treated emulsion from the upper portion of the heating chamber, said emulsion transfer means between the upper and lower chambers comprising a pipe passing through the partition and having an inlet opening spaced substantially below the partition and having a gas discharge opening intermediate said partition and said inlet opening.

12. An emulsion treater comprising a horizontally disposed tubular casing, an imperforate horizontal partition forming a heating chamber in the upper portion of said casing and a free water knockout chamber in the lower portion of said casing, means for admitting emulsion to be treated to the water knockout chamber, means in said knockout chamber for separating the free water from the emulsion, emulsion transfer means for passing emulsion from which free water has been separated, from the water knockout chamber to the heating chamber, heating means in the heating chamber for separating additional water from the emulsion, gravity means for returning the separated out water from the heating chamber to the water knockout chamber, means for withdrawing emulsion from the heating chamber for further treatment, means for withdrawing water from the water knockout chamber, said emulsion transfer means between the upper and lower chambers comprising a pipe passing through the partition and having an inlet opening spaced substantially below the partition and having a gas discharge opening intermediate said partition and said inlet opening, means for maintaining a layer of gas under pressure in a gas zone above the liquid level in the heating chamber, and pipe means for conveying gas separated out in the knockout zone to said upper gas zone.

13. An emulsion treater comprising a single elongated horizontally disposed tubular casing having a plurality of chambers in horizontal alignment, including at one end a combined heating and knockout chamber, and at the other end a filtering and settling chamber, and an intermediate washing and baffling chamber, substantially vertical partitions separating the horizontally aligned chambers, a horizontal partition dividing the combined heating and knockout chamber into separate superposed free water knockout and heating chambers, means for withdrawing hot clean oil from the upper portion of the filtering and settling chamber, heating means within the heating zone, means for passing fluid to be treated successively through the water knockout zone, the heating zone, the washing and baffling chamber and the settling chamber, means for withdrawing hot treated oil from the upper portion of the settling chamber, means for withdrawing water from the lower portion of the settling chamber, and a heat interchanger substantially completely surrounding and in close proximity to the treater at the heating end thereof, having an outer jacket for receiving the hot oil from the filtering and settling chamber, and an inner jacket for receiving the fluid to be treated prior to its entrance into the treater, whereby the incoming fluid is preheated and the outgoing oil is cooled prior to its passage to storage.

14. An emulsion treater comprising a single elongated horizontally disposed tubular casing having a plurality of chambers in horizontal alignment, including at one end a combined heating and knockout chamber, and at the other end a filtering and settling chamber, and an intermediate washing and baffling chamber, said combined heating and knockout chamber including a horizontal partition dividing a lower water knockout zone from a superposed heating zone, substantially vertical partitions separating the horizontally aligned chambers, means for withdrawing hot clean oil from the upper portion of the filtering and settling chamber, means for supplying fluid to be treated to the water knockout zone, and a heat interchanger substantially completely surrounding and in close proximity to the treater at the heating end thereof, having an outer jacket for receiving the hot oil from the filtering and settling chamber, and an inner jacket for receiving the fluid to be treated prior to its entrance into the treater, whereby the incoming fluid is preheated and the outgoing oil is cooled prior to its passage to storage, means for passing fluid from which free water has been separated from said knockout zone to the heating zone, means for maintaining a pressure differential in said chambers decreasing in the successive chambers from the heating and knockout chamber to the other end of the treater, and means for successively passing the fluid undergoing treatment from the heating zone to the settling chamber under the influence of said pressure differential zone.

15. An oil-emulsion treater comprising a single elongated horizontally disposed tubular casing comprising a plurality of chambers in horizontal alignment, including at one end a combined heating and knockout chamber, and at the other end a settling chamber, substantially vertical partition means separating said horizontally aligned chambers, restricted fluid passageways connecting said chambers and a horizontal partition separating the heating and knockout chambers means for passing under pressure fluid undergoing treatment successively through the free water knockout, heating and settling chambers, means for withdrawing water from the knockout chamber and discharging it into the lower portion of the filtering and settling chamber, and means for separately withdrawing substantially water free oil and oil free water from the system from the settling chamber.

16. An emulsion treater including a horizontal casing, means for forming a gas pressure zone at the top thereof, said casing having a heating chamber at one end thereof, heating means therein, a settling chamber at the other end, and a washing chamber intermediate the heating and settling chamber and communicating with each other, upright partitions separating said chambers, all said chambers communicating at the top with said gas zone, means for passing under pressure fluid undergoing treatment successively through the heating, washing and settling chambers, said washing chamber including a series of water discharge conduits each having an upwardly extending gas vent pipe communicating with said gas zone, and means for maintaining a pressure differential in said chambers decreasing in the successive chambers from the heating chamber to the settling chamber.

17. An emulsion treater including a plurality of laterally disposed washing and agitating zones, partitions separating said zones into separate chambers, means for passing under gradually diminishing pressure an emulsion fluid to be treated successively through said zone for separation of gas and water from the oil in said fluid, and means, including a series of inverted U-tubes, located in said successive chambers, for withdrawing water in separate streams from said separate chambers, the water inlet of each of said tubes being in the lower portion of its chamber, the leg including the water outlet extending through and below its respective chamber, and each having a gas vent pipe extending to the upper portion of its zone, whereby gas zones of successively diminishing pressures are provided at the upper portion of each chamber.

18. An emulsion treater comprising a closed tank having a horizontal partition dividing the tank into an upper heating chamber and a lower free water knockout chamber, a heating unit within the upper chamber, means, including a conduit discharging into the lower chamber below the partition, for supplying under pressure emulsion fluid to be treated to the free water knockout chamber to permit gravity separation of the free water and the fluid being treated with consequent formation of a lower water layer and a superposed layer of emulsion beneath the partition, emulsion transfer means including one or more conduits extending through the partition having an inlet spaced below the partition to permit upward passage of emulsion from which the free water has been separated into the upper chamber to be subjected to heat treatment to effect a breakdown of the emulsion into oily and water portions, means for withdrawing the oily portion from the upper chamber, and water return means for transferring separated out water from the upper chamber to the lower chamber, said water return means comprising a conduit extending through the partition and discharging at a point above the level of the inlet of the emulsion transfer means, said pipe being upwardly bent intermediate its ends to prevent reverse passage of emulsion therethrough.

19. An emulsion treater comprising a closed tank having an imperforate horizontal partition dividing the tank into upper and lower chambers, means for supplying heat to the upper chamber, means for supplying under pressure emulsion fluid to be treated to the lower chamber to permit gravity separation of free water from the fluid, emulsion transfer means permitting emulsion from the lower chamber to pass to the upper chamber for heat treatment to break the emulsion, said transfer means comprising a pipe extending through the partition and having its inlet spaced below the level of the partition, said pipe having an opening below the partition and above the inlet to permit escape of gas, the pipe being imperforate between said gas escape opening and said partition whereby an insulating blanket of gas is provided below the partition and separating the upper and lower chambers of said tank, venting means for releasing excess gas from beneath the partition, and means for returning the separated out watery portion released from the emulsion in the upper chamber to the lower chamber.

20. An emulsion treater comprising a closed tank having an imperforate horizontal partition dividing the tank into upper and lower chambers, means for supplying heat to the upper chamber, means for supplying under pressure emulsion fluid to be treated to the lower chamber to permit gravity separation of free water from the fluid, emulsion transfer means comprising a pipe extending through the partition and having its inlet spaced below the level of the partition, said pipe having an opening below the partition and above the inlet to permit escape of gas, the pipe being imperforate between said gas escape opening and said partition whereby an insulating blanket of gas is provided below the partition and separating the upper and lower chambers of said tank, means for releasing excess gas which accumulates beneath said partition comprising a pipe extending into the gas zone beneath the partition and discharging into the upper part of the upper chamber, and means for returning the separated out water from the upper chamber to the lower chamber.

21. An emulsion treater comprising an elongated, horizontally disposed tubular casing, vertical partition means dividing the casing into separate treating chambers in horizontal alignment including at one end a settling chamber and at the other end a combined heating and free water knockout chamber, a horizontal partition separating said combined chamber into superposed free water knockout and emulsion heating zones, means for supplying under pressure emulsion fluid to be treated to the free water knockout chamber to permit separation of free water from the emulsion, conduit means for transferring water from the bottom of the free water knockout chamber to the settling chamber, an emulsion transfer pipe extending through the horizontal partition to permit passage of emulsion from the free water knockout zone to the heating zone to effect breakdown of said emulsion, means for returning separated out water from the emulsion treating zone to the free water knockout zone, restricted conduit means for transferring heated emulsion fluid from said emulsion heating zone to said settling chamber, and means for separately withdrawing oil and water from the settling chamber at different levels.

22. An emulsion treater comprising a closed tank having wall portions defining a settling chamber, means for supplying under pressure to said chamber fluid to be treated containing gas, water and oil to permit separation into superposed water, oil and gas layers, hydrostatic means for maintaining a liquid level within said tank, said means including an oil discharge pipe having its inlet near the top of the tank but spaced below the same and a water withdrawal pipe having its inlet near the bottom of the tank and including an inverted U-tube to maintain the liquid level, and means for withdrawing surplus gas from the zone above the oil level comprising a conduit opening within the chamber above the level of the outlet of the oil withdrawal pipe, said conduit leading to the exterior of the tank, a control valve within said pipe and means for automatically opening or closing said valve according to variations in the oil level comprising a float connected to said valve and adapted to be supported upon the surface of the oil within the tank and to fluctuate with the variations in the level of the oil.

23. An emulsion treater comprising a single elongated horizontally disposed tubular casing having a gas zone extending along the upper portion thereof, substantially vertical partititons separating the casing into successive horizontally disposed chambers for performing diverse treating operations upon the fluid undergoing treatment, said horizontally disposed chambers including a combined heating and free water knockout chamber, a horizontal partition separating the combined chamber into upper and lower heating and free water knockout chambers respectively, means for passing under pressure fluid undergoing treatment successively through the free water knockout and heating chambers and thence through the remaining chambers of the series for further treatment, means for separately withdrawing oil and water from the last chamber of the series at different levels, and means for returning water separated out in previous chambers of the series to the last chamber of the series to permit final separation of oil therefrom.

24. An emulsion treater comprising a single horizontally disposed elongated tubular casing having aligned treating chambers therein, upright partitions separating the chambers and extending from top to bottom of said casing, said partitions having restricted openings to provide communication between the successive chambers, means for passing fluid undergoing treatment under pressure through successive chambers for separation of water, oil and gas from the fluid, means for separately withdrawing clean oil and oil free water from the last treating chamber of the series, means for withdrawing water separated out in previous chambers of the series from the treater and for returning the same to the last chamber of the series to permit recovery of any remaining traces of oil in the previously separated out water, and hydrostatic means for maintaining a controlled liquid level in all the chambers of the treater.

25. An emulsion treater comprising a single elongated horizontally disposed tubular casing having a plurality of separate chambers arranged in horizontal alignment for performing diverse treating operations upon the fluid undergoing treatment, said chambers including a combined heating and knockout chamber and a separating and settling chamber, upright partition means separating said horizontally aligned chambers, a horizontally disposed partition separating the heating and knockout chamber into a lower free water knockout portion and an upper heating portion, heating means within the upper zone, means for passing under pressure emulsion fluid to be treated successively through the free water knockout and heating portions of the combined heating and knockout chamber and thence to the settling chamber, means for withdrawing water separated out in the free water knockout chamber and discharging it into the lower portion of the separating and settling chamber, and means for separately withdrawing oil and water from different levels of the settling chamber.

26. The process of operating an emulsion treater including a series of separate horizontally aligned treating chambers enclosed in a single horizontally disposed casing, which process comprises passing emulsion fluid to be treated successively through said chambers and subjecting fluid undergoing treatment to successive heating, washing and settling operations in separate chambers, withdrawing substantially all of the oil obtained from said fluid from the final chamber of the series and separately withdrawing substantially all free water from the same chamber at a different level and throughout the operation continuously withdrawing separated out water during the heating and washing operations and returning such separated out water to the final chamber to permit removal of any traces of oil remaining in the separated out water.

27. A process as set forth in claim 26 wherein a gas blanket is maintained at the top of each of the treating chambers to minimize turbulence.

RANSOME W. ERWIN.

(References on following page)

REFERENCES CITED

The following references are of record in the file of this patent:

UNITED STATES PATENTS

| Number | Name | Date |
|---|---|---|
| 1,052,963 | Reid | Feb. 11, 1913 |
| 1,396,860 | Lorraine | Nov. 15, 1921 |
| 1,559,035 | Egloff et al. | Oct. 27, 1925 |
| 1,624,092 | Coleman | Apr. 12, 1927 |
| 1,648,558 | Meston et al. | Nov. 8, 1927 |
| 1,897,398 | Raymond | Feb. 14, 1933 |
| 2,043,379 | Justus | June 9, 1936 |
| 2,122,310 | Burt | June 28, 1938 |
| 2,179,131 | Millard | Nov. 7, 1939 |
| 2,261,101 | Erwin | Oct. 28, 1941 |
| 2,342,950 | Lovelady et al. | Feb. 29, 1944 |
| 2,384,222 | Walker | Sept. 4, 1945 |
| 2,398,338 | Walker | Apr. 9, 1946 |
| 2,420,115 | Walker et al. | May 6, 1947 |
| 2,421,375 | Elliot | June 3, 1947 |
| 2,457,959 | Walker | Jan. 4, 1949 |